No. 684,157. Patented Oct. 8, 1901.
W. F. WILLIAMS.
ELASTIC TIRE.
(Application filed Feb. 21, 1901.)
(No Model.) 2 Sheets—Sheet 1.
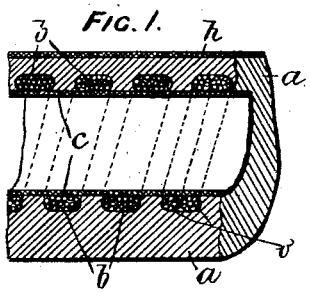
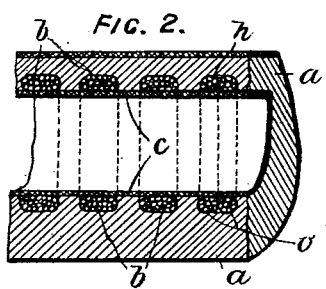
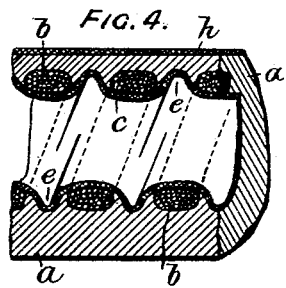
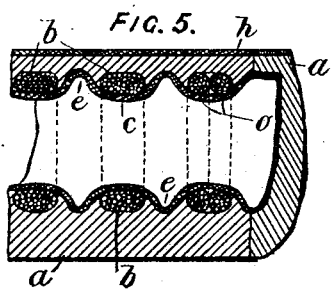
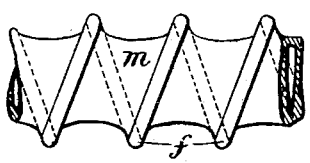
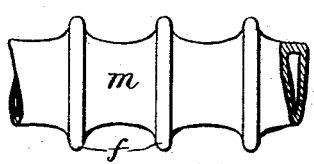
Witnesses.
Inventor:
William F. Williams.
By Munn
Attorneys.
THE NORRIS PETERS CO., PHOTO-LITHO., WASHINGTON, D. C.

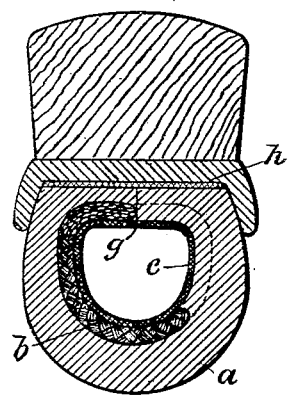
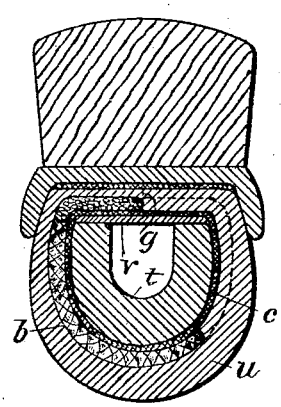
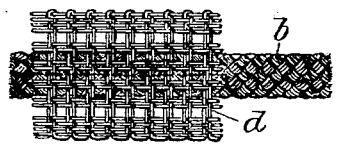
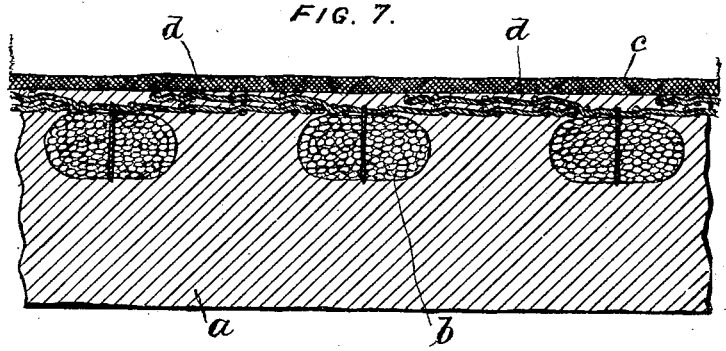

UNITED STATES PATENT OFFICE.

WILLIAM FREDERICK WILLIAMS, OF LONDON, ENGLAND.

ELASTIC TIRE.

SPECIFICATION forming part of Letters Patent No. 684,157, dated October 8, 1901.

Application filed February 21, 1901. Serial No. 48,313. (No model.)

*To all whom it may concern:*

Be it known that I, WILLIAM FREDERICK WILLIAMS, gentleman, a subject of the King of Great Britain, residing at 17 and 18 Great Pulteney street, London, W., England, have invented new and useful Improvements in Elastic Tires, of which the following is a specification.

My invention relates to the manufacture of hollow rubber wheel-tires of D or approximately D section adapted to be secured to the wheel-rim by a band passing through the bore of the tire; and the invention has for its object to increase the strength of the tire, so as the better to enable it to resist being torn away under lateral strain, a further object being to economize rubber.

The invention consists, essentially, in embedding in the rubber a cord or cords of round, flat, or other section, the cord or cords being either in the form of a continuous helix or of independent convolutions extending around the bore of the tire, the convolutions being either close together or, preferably, alternated with intervening portions of rubber. With the cord or cords I may combine a reinforcing-strip of open-meshed fabric adapted to bridge over the intervals between the cord convolutions when spaced as above mentioned and serve as a guide for insuring uniformity of spacing in winding the cord or cords upon the mandrel and as a means of insuring a firmer union between the cord and the rubber.

Reference is to be had to the accompanying drawings, forming a part of this specification, wherein—

Figures 1 and 2 are part longitudinal sections of tires having a cord or cords embedded therein, the cord being continuous and helically wound in Fig. 1 and forming separate convolutions in Fig. 2. Fig. 3 is a cross-section of the tire shown in Fig. 1. Figs. 4 and 5 are part longitudinal sections similar to Figs. 1 and 2, respectively, but having grooves intervening in the bore of the tire between the cord convolutions. Fig. 6 shows a portion of the cord provided with an attached reinforcing-strip of open-meshed fabric. Fig. 7 is a part longitudinal section, drawn to a larger scale, of a tire-tread similar to that shown in Fig. 1, but provided with a reinforcing-strip, as in Fig. 6. Figs. 8 and 9 show the mandrels used in the manufacture of the tires illustrated in Figs. 4 and 5, respectively. Fig. 10 is a cross-section showing the invention as applied to the cover of a tire.

The same letters of reference denote like parts in all the figures.

The hollow tire is made of D or approximately D form in cross-section, the bore being either of D, triangular, oval, or other form.

*a* is the rubber, *b* is the cord embedded in the rubber, and *c* is a canvas liner for the bore of the tire.

The operation of making a tire such as shown in Figs. 1 and 3 is performed upon a mandrel of a section corresponding to the intended form of the bore. If the bore of the tire is to be provided with a canvas liner *c*, a strip of rubber-coated canvas would first be wrapped upon the mandrel, the rubber-coated surface being outward and the overlapping edges of the strip being united, or the liner may be formed of two or more superposed strips solutioned together. About the liner-covered mandrel is then wound, in the form of a helix, (either closely wound or, preferably, with spaces intervening between the convolutions,) a fibrous cord or cords or band *b* of round, flat, or other section, secured in position on the mandrel either by adhering to the rubber-coated canvas liner *c*, if used, or by being otherwise secured. If two or more cords are used, the convolutions may be juxtaposed, as at *o*, to form in effect a flat band, of which the convolutions may be spaced. If the convolutions be spaced as shown in Fig. 1, the intervening spaces may first be filled up with plastic rubber, after which rubber may be applied about the whole to form the tire by extrusion of the rubber through a die through which the mandrel (with the cord wound thereon) is passed, after which the tire is vulcanized, as usual, preferably before removal of the mandrel.

If instead of helical convolutions the convolutions of cord *b* be separate, as indicated in Fig. 2, each lying in a transverse plane, these convolutions would be formed of short lengths of cord whose ends abut (preferably at the center line of the base of the mandrel) and are caused to adhere to the canvas liner c, (previously applied upon the mandrel,) so as to be thereby retained in place while the rubber is being applied.

In order to form a guide in winding the cord on the mandrel and strengthen the adhesion of the rubber to the cord convolutions, there may be combined either with the continuous helical cord when wound with intervening spaces or with the separate cords a reinforcing-strip d of open-meshed fabric, such as shown in Fig. 6, the strip being stitched or otherwise attached to the cord b and being preferably woven with selvaged edges and made of such width as to project sufficiently at either side of the cord to bridge over the interval between two adjacent convolutions of cord, the adjacent margins overlapping, as indicated in Fig. 7, and being, so to speak, "keyed together" by the rubber passing through the meshes of both.

The position of the cords on the mandrel may be determined and at same time grooves (open to the bore of the tire) may be formed, as shown at e in Fig. 4, by providing the mandrel m with a helical rib f, as shown in Fig. 8. The mandrel having been covered with the canvas to form the liner c, as in the former case, the cord (either single, as at b, or multiple, as at o, as before explained) is wound upon the mandrel between the convolutions of the spiral rib or ribs f, as the case may be, the subsequent operation of applying the rubber being performed as before described. Similarly to form the tire shown in Fig. 5 the spacing of the cords and the formation of intermediate grooves in the bore, as shown at e in Fig. 5, may be insured by providing the mandrel m, as in Fig. 9, with circumferential ribs or corrugations f, between which the cords b or o would be laid.

If necessary in order to permit the removal of the mandrel from the tire, the flat base of the latter may be slit longitudinally along the center line, as at g in Fig. 3, the severed portions being reunited or not by cementing together the cut faces and by applying to the base of the tire a covering strip or strips of rubber-coated canvas h, cemented on.

The cord which I prefer to use is a plaited cord of round, square, flattened, or oval section; but I wish it to be understood that any fibrous material may be used and that under the term "cord" herein I intend to include twisted cords or ropes of all diameters suited to the particular tires in which they are to be embedded.

In order to further insure the adhesion of the rubber to the cord, it is preferred to coat or impregnate the cord with a rubber solution.

It is to be understood that the invention is not only applicable to tires intended to be used without being incased in an outer jacket, but is also applicable to a tire which is incased in a jacket, and, furthermore, that the D-shaped jacket or outer cover of the tire may itself be provided with cords in the same way as above described in respect of the tire. This latter arrangement is illustrated in Fig. 10, wherein t is the tire incased in a jacket u, secured to the wheel-rim by a band v, the jacket u being lined with canvas c and having a cord or cords b embedded in the rubber of the jacket in the manner already described. The jacket u is slit open along the base, as at g, to enable it to be sprung over the tire t.

I claim—

1. The combination with a hollow rubber cushion-tire of substantially D-section adapted to be secured to the wheel-rim by a holding-on band passing through the bore of the tire, of an inner protective sheathing formed of fibrous cord in the form of transversely circumferential convolutions embedded or partially embedded in the rubber of the tire or tire-cover, substantially as specified.

2. The combination with a hollow rubber cushion-tire of substantially D-section adapted to be secured to a wheel-rim by a holding-on band passing through the bore of the tire, of an inner protective sheathing formed of fibrous cord in the form of transversely circumferential convolutions embedded or partially embedded in the rubber of the tire or tire-cover, and of a liner of canvas cemented to the coils of cord and to the intervening rubber, as specified.

3. A hollow rubber cushion-tire having fibrous cord in the form of a single continuous helix embedded in the internal surface of the rubber immediately surrounding the bore of the tire so as to afford protection to the internal surface of the tire against injury by the holding-on band, the convolutions of the cord being alternated with rubber forming an integral part of the external wall of the tire.

4. The combination with a hollow rubber tire of substantially D-section, of an inner protective sheathing formed of fibrous cord in the form of spaced convolutions embedded or partially embedded in the rubber of the tire or tire-cover, and reinforcing-strips of open-meshed canvas united to the cord and projecting laterally so that the margins of the strips attached to adjacent convolutions of cord overlap and are keyed together by the rubber entering the meshes of both, substantially as described.

5. A hollow rubber tire of substantially D-section having embedded or partially embedded therein convolutions of fibrous cord, adjacent convolutions being separated by rubber having a groove molded therein, substantially as specified.

6. The method of making a hollow rubber tire or tire-cover having fibrous cord in the form of helical convolutions embedded or partially embedded therein, which method consists in winding a continuous length of cord in the form of an open helix upon a mandrel of the intended form of the bore, filling the intervening spaces with rubber, and molding the rubber thereon by extrusion through a die through which the cord-wound mandrel is also passed, substantially as specified.

WILLIAM FREDERICK WILLIAMS.

Witnesses:
C. G. CLARK,
T. W. KENNARD.